United States Patent
Chang

(10) Patent No.: US 11,277,066 B2
(45) Date of Patent: Mar. 15, 2022

(54) CONTROL CIRCUIT FOR FACILITATING INRUSH CURRENT REDUCTION FOR A VOLTAGE REGULATOR AND A VOLTAGE REGULATION APPARATUS WITH INRUSH CURRENT REDUCTION

(71) Applicant: ELITE SEMICONDUCTOR MEMORY TECHNOLOGY INC., Hsinchu (TW)

(72) Inventor: Yao-Ren Chang, Zhunan Township (TW)

(73) Assignee: ELITE SEMICONDUCTOR MEMORY TECHNOLOGY INC., Hsinchu (TW)

( * ) Notice: Subject to any disclaimer, the term of this patent is extended or adjusted under 35 U.S.C. 154(b) by 129 days.

(21) Appl. No.: 16/792,953

(22) Filed: Feb. 18, 2020

(65) Prior Publication Data
US 2021/0257902 A1 Aug. 19, 2021

(51) Int. Cl.
H02M 1/32 (2007.01)
H02M 1/36 (2007.01)
H02M 1/00 (2006.01)

(52) U.S. Cl.
CPC ............... *H02M 1/32* (2013.01); *H02M 1/36* (2013.01); *H02M 1/0025* (2021.05)

(58) Field of Classification Search
CPC ........ H02M 1/32; H02M 1/36; H02M 1/0025; H02M 3/156; H02M 3/158; G05F 1/575; G05F 1/468
See application file for complete search history.

(56) References Cited

U.S. PATENT DOCUMENTS

| | | | | |
|---|---|---|---|---|
| 6,969,977 B1 * | 11/2005 | Smith | ..................... | H02M 1/36 323/222 |
| 7,821,244 B1 * | 10/2010 | Signoretti | ............. | H02M 3/158 323/288 |
| 7,990,123 B2 | 8/2011 | Lim et al. | | |
| 2009/0243579 A1 * | 10/2009 | Lim | ........................ | H02M 1/36 323/284 |
| 2015/0381032 A1 * | 12/2015 | Li | .......................... | H02M 1/36 323/271 |
| 2018/0083549 A1 * | 3/2018 | Yao | ....................... | H02M 3/156 |

* cited by examiner

*Primary Examiner* — Kyle J Moody
*Assistant Examiner* — Jye-June Lee
(74) *Attorney, Agent, or Firm* — Schmeiser, Olsen & Watts, LLP

(57) ABSTRACT

A control circuit is introduced for facilitating inrush current reduction for a voltage regulator providing an output voltage variable in response to an output voltage selection. The control circuit includes a soft-start circuit, a soft-start tracking circuit, and a controller. The soft-start circuit is utilized for providing a soft-start signal. The soft-start tracking circuit includes a first input terminal for receiving a feedback signal from the voltage regulator, a second input terminal coupled to the soft-start circuit, and an output terminal coupled to the soft-start circuit. The controller, coupled to the soft-start tracking circuit, is configured to output an enabling signal to the soft-start tracking circuit selectively in accordance with the output voltage selection. The soft-start tracking circuit is operable in response to the enabling signal so that the soft-start signal provided by the soft-start circuit substantially follows the feedback signal from the voltage regulator.

17 Claims, 6 Drawing Sheets

CONTROL CIRCUIT FOR FACILITATING INRUSH CURRENT REDUCTION FOR A VOLTAGE REGULATOR AND A VOLTAGE REGULATION APPARATUS WITH INRUSH CURRENT REDUCTION

BACKGROUND OF THE INVENTION

1. Field of the Invention

The present disclosure relates to a voltage regulator, and in particular to a control circuit for facilitating inrush current reduction for a voltage regulator and a voltage regulation apparatus with inrush current reduction.

2. Description of the Related Art

In power supply circuit, non-isolated switching regulator having an inductor is used because of high efficiency. Hence it is suitable in many applications, for example, portable devices or large electronic devices However, there are many technical considerations needing to be resolved in order to design a switching regulator with desirable performance. One of such consideration is how to start up a switching regulator. Without proper startup method, output voltage will have large overshoot and in-rush current that is used to charge up output capacitor will be very big. It can destroy the IC or external components. Common countermeasure for this issue is solved by adding a soft-start circuit during the initial startup. Soft-start circuit is able to generate a slow ramping voltage hence slowly increase the output voltage to the required value. This slow ramping voltage can be either connected to input of PWM comparator or acting as a reference voltage for error amplifier. This can prevent large overshoot and limit in-rush current.

In some practical applications, some switching regulators have variable output voltages. Some problems related to such switching regulators are that overshoot and large in-rush currents can occur when output voltage is changed from a low to a high voltage. Conventional soft-start circuit does not operate after the switching regulator has been powered up. Therefore, it cannot provide protection when there is a change in output voltage after initial startup.

BRIEF SUMMARY OF THE INVENTION

An objective of the present disclosure is to provide a control circuit for facilitating inrush current reduction for a voltage regulator.

To achieve the above objective, the present disclosure provides a control circuit for facilitating inrush current reduction for a voltage regulator, wherein the voltage regulator is used for providing an output voltage variable in response to an output voltage selection. The control circuit comprises a soft-start circuit, a soft-start tracking circuit, and a controller. The soft-start circuit is utilized for providing a soft-start signal. The soft-start tracking circuit includes a first input terminal for receiving a feedback signal from the voltage regulator, a second input terminal coupled to the soft-start circuit, and an output terminal coupled to the soft-start circuit. The controller, coupled to the soft-start tracking circuit, is configured to output an enabling signal to the soft-start tracking circuit selectively in accordance with the output voltage selection. The soft-start tracking circuit is operable in response to the enabling signal so that the soft-start signal provided by the soft-start circuit substantially follows the feedback signal from the voltage regulator.

In an embodiment, the controller is configured to output the enabling signal to enable the soft-start tracking circuit to operate when the output voltage selection satisfies a criterion for generating the enabling signal.

In an embodiment, the controller determines that the output voltage selection satisfies the criterion when the output voltage selection indicates a selection from a present output voltage to a target output voltage higher than the present output voltage.

In an embodiment, the controller is further configured to output an output selection signal for informing the voltage regulator of the output voltage selection in response to the output voltage selection.

In an embodiment, the controller outputs the enabling signal asserted for a time period to enable the soft-start tracking circuit to operate when the controller outputs the output selection signal.

Another objective of the present disclosure is to provide a voltage regulation apparatus with inrush current reduction.

To achieve the above objective, the present disclosure provides a voltage regulation apparatus comprising a voltage regulator and a control circuit. The voltage regulator is employed to provide an output voltage variable in response to an output voltage selection, including a soft-start terminal, an output voltage terminal, and a feedback terminal. The control circuit, coupled to the voltage regulator, includes a soft-start circuit, a soft-start tracking circuit, and a controller. The soft-start circuit, coupled to the soft-start terminal, is utilized for providing a soft-start signal to the voltage regulator. The soft-start tracking circuit includes a first input terminal for receiving a feedback signal outputted from the feedback terminal of the voltage regulator, a second input terminal coupled to the soft-start circuit, and an output terminal coupled to the soft-start circuit. The controller, coupled to the soft-start tracking circuit, is configured to output an enabling signal to the soft-start tracking circuit selectively in accordance with the output voltage selection. The soft-start tracking circuit is operable in response to the enabling signal so that the soft-start signal provided by the soft-start circuit substantially follows the feedback signal from the voltage regulator.

In some embodiments, the voltage regulator may be implemented by using a linear voltage regulator or a switching voltage regulator.

In some embodiments, the voltage regulator includes an error amplifier, an output circuit stage, and a switchable voltage divider. The error amplifier is coupled to the feedback terminal, the soft-start terminal, and a reference voltage terminal. The output circuit stage is coupled between an output terminal of the error amplifier and the output voltage terminal. The switchable voltage divider, coupled between the output voltage terminal and the feedback terminal, is utilized for providing the feedback signal in response to the output voltage selection so as to enable varying of the output voltage.

In an embodiment, the voltage regulation apparatus is a single chip.

To achieve the above objective, the present disclosure further provides a control circuit for facilitating inrush current reduction for a voltage regulator, wherein the voltage regulator is used for providing an output voltage variable in response to an output voltage selection. The control circuit includes a soft-start tracking circuit and a controller. The soft-start tracking circuit includes a first input terminal for receiving a feedback signal from the voltage regulator, a second input terminal, and an output terminal, wherein the second input terminal and the output terminal are used for being coupled to a soft-start circuit for providing a soft-start signal. The controller, coupled to the soft-start tracking circuit, configured to output an enabling signal to the soft-start tracking circuit selectively in accordance with the output voltage selection. The soft-start tracking circuit is operable in response to the enabling signal so that the soft-start signal provided by the soft-start circuit substantially follows the feedback signal from the voltage regulator.

In an embodiment, the controller includes a detection circuit configured to output the enabling signal to enable the soft-start tracking circuit to operate when the output voltage selection satisfies a criterion for generating the enabling signal.

In an embodiment, the detection circuit determines that the output voltage selection satisfies the criterion when the output voltage selection indicates a selection from a present output voltage to a target output voltage higher than the present output voltage.

In an embodiment, the detection circuit outputs the enabling signal asserted for a time period to enable the soft-start tracking circuit to operate.

As such, the embodiments of the control circuit for facilitating inrush current reduction for a voltage regulator and the voltage regulation apparatus with inrush current reduction are provided, wherein the control circuit has the soft-start tracking circuit operable in response to the enabling signal so that the soft-start signal provided by the soft-start circuit substantially follows the feedback signal from the voltage regulator. In this way, whenever the voltage regulator has a level transition of its output voltage which will cause inrush current at its output voltage, the control circuit outputs the enabling signal to provide the soft-start signal following the feedback signal to the voltage regulator so as to reactivate soft-start functionality of the voltage regulator during level transition, thus reducing inrush current effectively and proactively.

DETAILED DESCRIPTION OF THE INVENTION

To facilitate understanding of the object, characteristics and effects of this present disclosure, embodiments together with the attached drawings for the detailed description of the present disclosure are provided.

Figure 1:
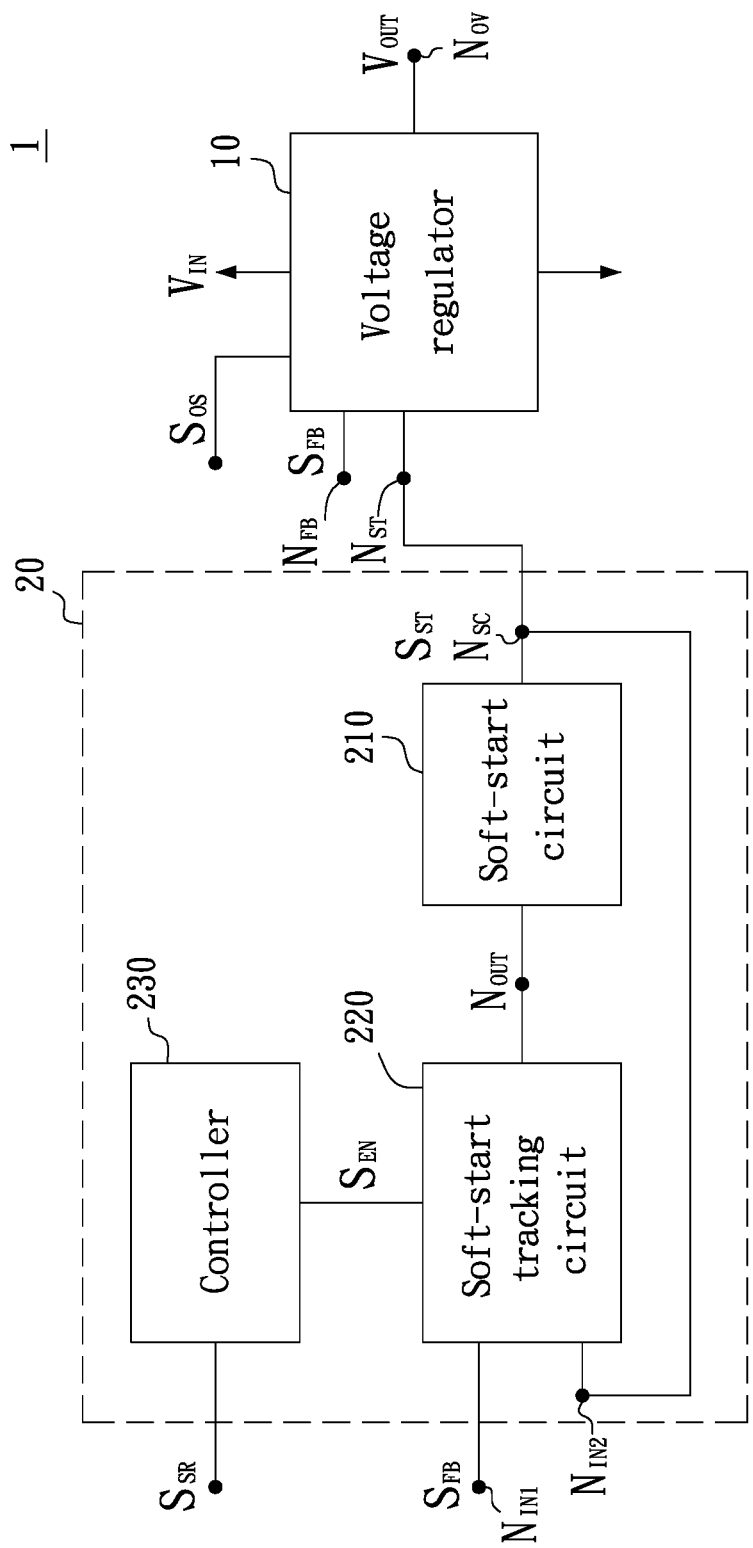
FIG. 1 is a schematic diagram illustrating a voltage regulation apparatus using a control circuit for facilitating inrush current reduction according to embodiments of the present disclosure.

Referring to FIG. 1, a voltage regulation apparatus 1 with inrush current reduction is illustrated according to embodiments of the present disclosure in a schematic diagram form. As shown in FIG. 1, a voltage regulation apparatus 1 comprises a voltage regulator 10 and a control circuit 20. The control circuit 20, coupled to the voltage regulator 10, is utilized for facilitating inrush current reduction for the voltage regulator 10.

The voltage regulator 10 provides an output voltage $V_{OUT}$ variable in response to an output voltage selection, and includes a soft-start terminal $N_{FB}$, an output voltage terminal $N_{OV}$, and a feedback terminal $N_{ST}$. For example, the voltage regulator 10 is coupled between an input voltage $V_{IN}$ and a ground and outputs a regulated voltage signal, that is, the output voltage $V_{OUT}$, which can be changed to one of different predetermined voltage levels, for instance, by way of a voltage divider, according to the output voltage selection. Inrush current may probably occur at the output voltage terminal $N_{OV}$ during the transition of output voltage level, for example, from a present voltage level to a target voltage level which is higher than the present voltage level.

The control circuit 20 is utilized for facilitating inrush current reduction for the voltage regulator 10 and includes a soft-start circuit 210, a soft-start tracking circuit 220, and a controller 230. The soft-start circuit 210 has a soft-start control terminal $N_{SC}$ for providing a soft-start signal $S_{ST}$ at the soft-start control terminal $N_{SC}$. The soft-start tracking circuit 220 includes a first input terminal Nuri for receiving a feedback signal $S_{FB}$ from the voltage regulator 10, a second input terminal $N_{IN2}$ for being coupled to the soft-start circuit 210, such as the soft-start control terminal $N_{SC}$, and an output terminal $N_{OUT}$ for being coupled to the soft-start circuit 210. The controller 230, coupled to the soft-start tracking circuit 220, is configured to output an enabling signal $S_{EN}$ to the soft-start tracking circuit 220 selectively in accordance with the output voltage selection.

In this way, the soft-start tracking circuit 220 is operable in response to the enabling signal $S_{EN}$ so that the soft-start signal $S_{ST}$ provided by the soft-start circuit 210 substantially follows the feedback signal $S_{FB}$ from the voltage regulator 10.

Hence, the control circuit 20 can facilitate inrush current reduction for the voltage regulator 10 whenever the voltage regulator 10 has a level transition of its output voltage $V_{OUT}$ which may cause inrush current and overshoot. For example, in a scenario that the voltage regulator 10 is incapable of performing a soft-start function after started up, the control circuit 20 can be configured to reactivate the soft-start function of the voltage regulator 10 whenever it is required to reduce inrush current and overshoot which may occur at its output voltage $V_{OUT}$. The control circuit 20 can achieve this by outputting the soft-start signal $S_{ST}$ which follows the feedback signal $S_{FB}$ to the voltage regulator 10 whenever the control circuit 20 receives a new output voltage selection of the voltage regulator 10 indicating a voltage level transition that will cause inrush current at its output voltage $V_{OUT}$, thus reducing inrush current effectively and proactively.

In the above embodiment, the output voltage selection may be indicated by a selection request signal $S_{SR}$, such as generated by a processing unit (not shown) of a computing system in which the voltage regulation apparatus 1 is employed, outputted from another component, or initiated internally.

In an embodiment, the controller 230 can be optionally configured to output an output selection signal $S_{OS}$ for informing the voltage regulator 10 of the output voltage selection in response to the selection request signal $S_{SR}$. In another embodiment, the output selection signal $S_{OS}$ may be implemented by way of a processing unit (not shown) of a computing system in which the voltage regulation apparatus 1 is employed. In an embodiment, the voltage regulator 10 may be implemented to receive the selection request signal $S_{SR}$ and then generate the output selection signal $S_{OS}$ internally. Certainly, the implementation of the invention is not limited to the above examples.

In some embodiments, the voltage regulator 10 may be implemented by using a linear voltage regulator or a switching voltage regulator. Any voltage regulator which is used to provide an output voltage $V_{OUT}$ variable in response to an output voltage selection can be taken as the voltage regulator 10 in FIG. 1. The voltage regulator 10 may be implemented including a linear or switching voltage regulator and a switchable voltage divider for selecting one of a plurality of output levels predetermined.

Figure 2:
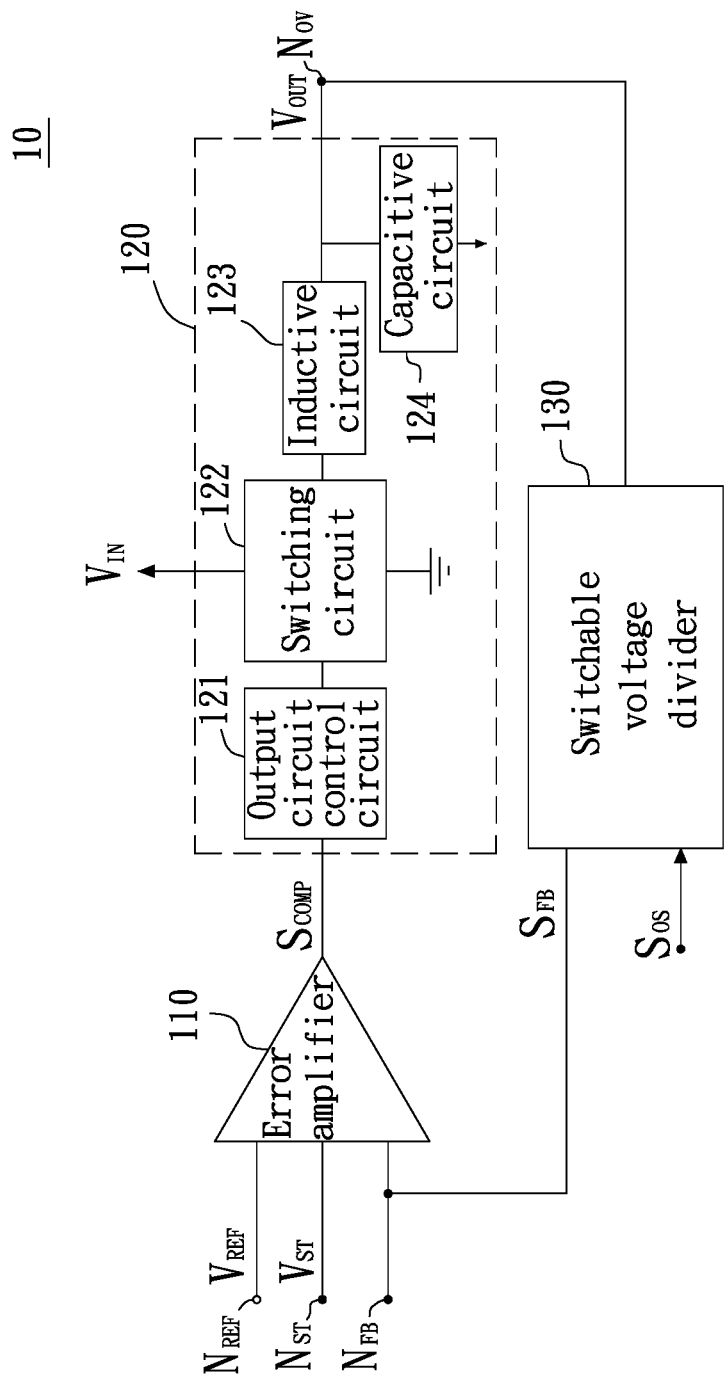
FIG. 2 is a schematic diagram of an embodiment of a voltage regulator of the voltage regulation apparatus of FIG. 1.

For the sake of understanding, referring to FIG. 2, an embodiment of the voltage regulator 10 of the voltage regulation apparatus 1 of FIG. 1 is illustrated in a schematic diagram form. The voltage regulator 10 includes an error amplifier 110, an output circuit stage 120, and a switchable voltage divider 130.

The error amplifier 110 includes a first input terminal coupled to the feedback terminal $N_{ST}$, a second input terminal coupled to a reference voltage terminal for receiving a reference voltage $V_{REF}$, a third input terminal coupled to the soft-start terminal $N_{FB}$, and an output terminal to output a comparison signal $S_{COMP}$. For example, the error amplifier 110 has a soft-start function that can be activated through applying a soft-start signal to the soft-start terminal $N_{FB}$ so as to reduce inrush current. Certainly, the implementation of the invention is not limited to the above examples.

The output circuit stage 120 is coupled between an output terminal of the error amplifier 110 and the output voltage terminal $N_{OV}$. For example, the output circuit stage 120, coupled between the input voltage $V_{IN}$ and the ground, includes an output circuit control circuit 121, a switching circuit 122, and an inductive circuit 123. The output circuit control circuit 121 can be any other suitable control circuit for modulating control signals for the switching circuit 122 responsive to the comparison signal $S_{COMP}$ of the error amplifier 110, such as a pulse width modulation (PWM) control circuit or a pulse frequency modulation (PFM) control circuit. The switching circuit 122 may be implemented using transistors, for example, a pull-up transistor and a pull-down transistor, coupled between the input voltage $V_{IN}$ and the ground, controlled by the control signals from the output circuit control circuit 121. The inductive circuit 123, such as an inductor, is connected between the output of the switching circuit 122 and the output voltage terminal $N_{OV}$. The output voltage terminal $N_{OV}$ may be further coupled to other circuit element(s) such as capacitive circuit 124 or other, whenever appropriate. Certainly, the implementation of the invention is not limited to the above examples.

The switchable voltage divider 130, coupled between the output voltage terminal $N_{OV}$ and the feedback terminal $N_{ST}$, is utilized for providing the feedback signal $S_{FB}$ in response to the output selection signal $S_{OS}$ indicating the output voltage selection so as to enable changing voltage level of the output voltage $V_{OUT}$.

Figure 3:
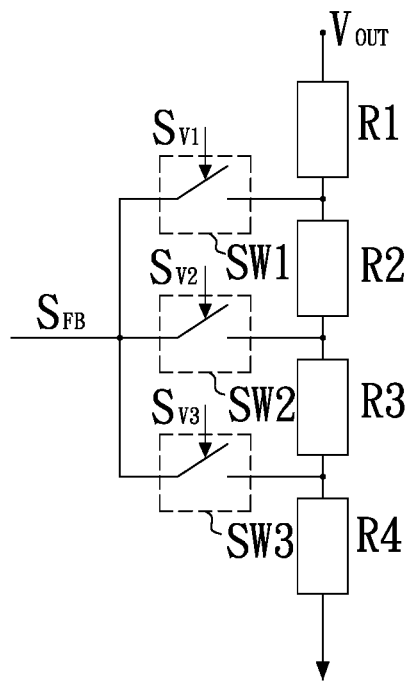
FIG. 3 is a schematic diagram illustrating an embodiment of a switchable voltage divider of the voltage regulator of FIG. 2.

Referring to FIG. 3, an embodiment of the switchable voltage divider 130 of the voltage regulator 10 of FIG. 2 is illustrated in a schematic diagram form. As shown in FIG. 3, the switchable voltage divider 130 includes a plurality of resistors, such as resistors R1, R2, R3, R4, and a plurality of switches, such as switches SW1, SW2, SW3 (e.g., switches implemented by transistors, such as NMOS, PMOS, or any suitable transistor). For example, each of the switches SW1-SW3 is connected between the feedback terminal $N_{ST}$ and one end of a corresponding one of the resistors. The switches SW1-SW3 can be controlled by respective control signals, indicated by $S_{V1}$, $S_{V2}$, and $S_{V3}$. Referring to FIGS. 1 and 3, the output selection signal $S_{OS}$ from the control circuit 20 indicates an output voltage selection that may be implemented in the form of the control signals $S_{V1}$-$S_{V3}$ to turn on one of the switches SW1-SW3 so as to enable changing voltage level of the output voltage $V_{OUT}$.

Figure 6:
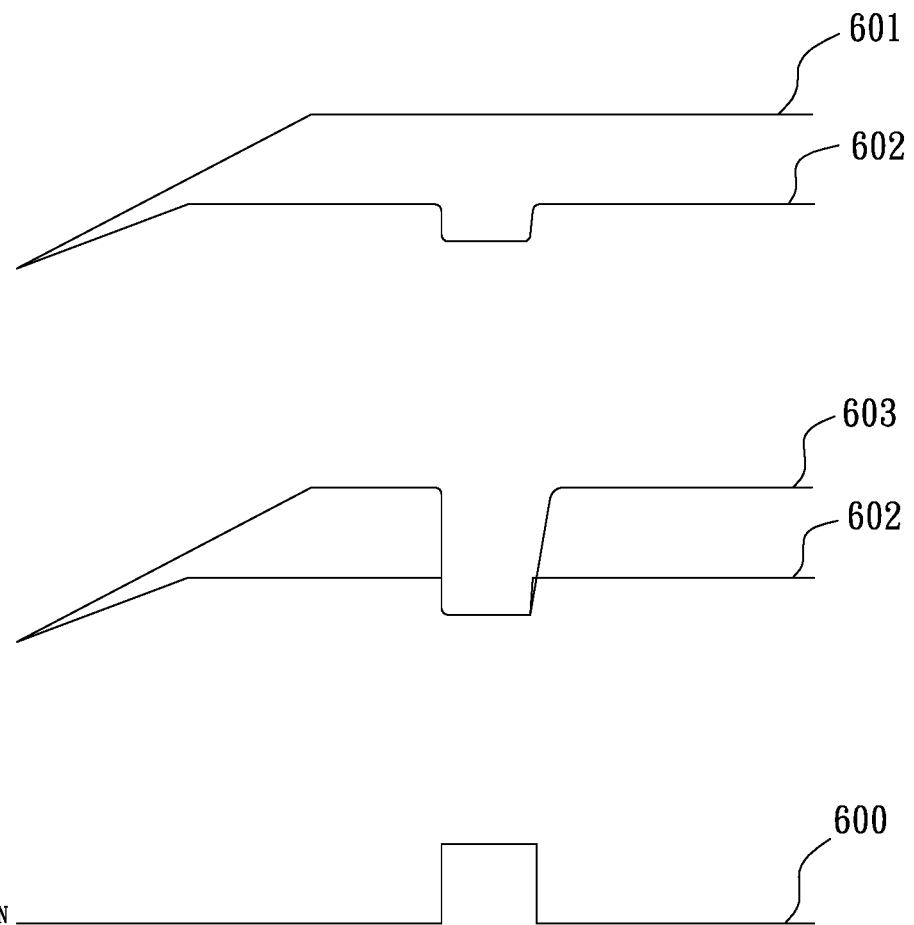
FIG. 6 is a schematic diagram illustrating variation of a soft-start signal, a feedback signal, and an enabling signal.

While the output voltage selection is changed, the feedback signal $S_{FB}$ provided by the switchable voltage divider 130 as well as the output voltage $V_{OUT}$ will vary. For example, when the switch SW1 is turned on and the switches SW2-SW3 are turned off, the output voltage $V_{OUT}$ will be at a first voltage level; when the switch SW2 (or SW3) is turned on and the remaining switches are turned off, the output voltage $V_{OUT}$ will be at a second voltage level (or third voltage level), wherein the third voltage level is greater than the second voltage level and the first voltage level is less than the second voltage level. It is noted that there is a transition from a present voltage level to a target voltage level, where the output voltage $V_{OUT}$ may be unstable because inrush current and overshoot will probably occur due to the component characteristic such as the inductive circuit 123 in the output circuit stage 120 while the feedback signal $S_{FB}$ will vary due to the switching on or off of the switches SW1-SW3. In the case as exemplified in FIG. 3, when a present output voltage selection, as compared to a previous output voltage selection, indicates a voltage level transition from a lower voltage level (such as the first voltage level) to a higher voltage level (such as the second or third voltage level), there will be a drop of the feedback signal $S_{FB}$, as indicated by a curve 602 illustrated in FIG. 6. If it is supposed that the voltage regulator 10 is configured to operate without the assistance of the control circuit 20, the soft-start signal $S_{ST}$, as indicated by a curve 601 illustrated in FIG. 6, will remain unchanged after the voltage regulator 10 is started up. By contrast, referring to FIGS. 1-4, by utilizing the control circuit 20, the soft-start signal $S_{ST}$, as indicated by a curve 603 illustrated in FIG. 6, will vary and follows the feedback signal $S_{FB}$ when the enabling signal $S_{EN}$, as indicated by a curve 600 illustrated in FIG. 6, is generated, or asserted, during the voltage level transition as discussed above. Specifically, in above exemplary case that the feedback signal $S_{FB}$ has a drop during the voltage level transition, the soft-start signal $S_{ST}$ can be controlled by the soft-start tracking circuit 220, which is enabled by the controller 230, so as to follow the feedback signal $S_{FB}$ approximately, so as to reactivate the soft-start function of the voltage regulator 10, such as that provided by the error amplifier 110. Certainly, the implementation of the invention is not limited to the above examples.

In an embodiment, the voltage regulation apparatus 1 may be implemented as a single chip.

In an embodiment, the control circuit 20 may be implemented as a single chip.

The following provides various embodiments of the control circuit 20 for facilitating inrush current reduction for a voltage regulator.

In an embodiment, the controller 230 is configured to output the enabling signal $S_{EN}$ to enable the soft-start tracking circuit 220 to operate when the output voltage selection indicated by the selection request signal $S_{SR}$ satisfies a criterion for generating the enabling signal $S_{EN}$.

In an embodiment, the controller 230 determines that the output voltage selection indicated by the selection request signal $S_{SR}$ satisfies the criterion when the output voltage selection indicates a selection from a present output voltage $V_{OUT}$ to a target output voltage $V_{OUT}$ higher than the present output voltage $V_{OUT}$. For example, when receiving an updated selection request signal $S_{SR}$ and prior to outputting a latest output selection signal $S_{OC}$, the controller 230 compares the output voltage selection indicated by the updated selection request signal $S_{SR}$ with the output voltage selection indicated by the present one, and determines whether the output voltage selection indicated by the updated selection request signal $S_{SR}$ satisfies the criterion. If so, the controller 230 outputs the enabling signal $S_{EN}$ and the output selection signal $S_{OC}$.

In an embodiment, the controller 230 may be implemented to output the enabling signal $S_{EN}$ asserted for a time period to enable the soft-start tracking circuit 220 to operate when the controller 230 outputs the output selection signal $S_{OS}$. For instances, the time period may be set to be 50 ms, 100 ms, 200 ms, 300 ms, and any suitable time period that is appropriate for reducing inrush current during the voltage level transition effectively and proactively. Certainly, the implementation of the invention is not limited to the above examples.

Figure 4:
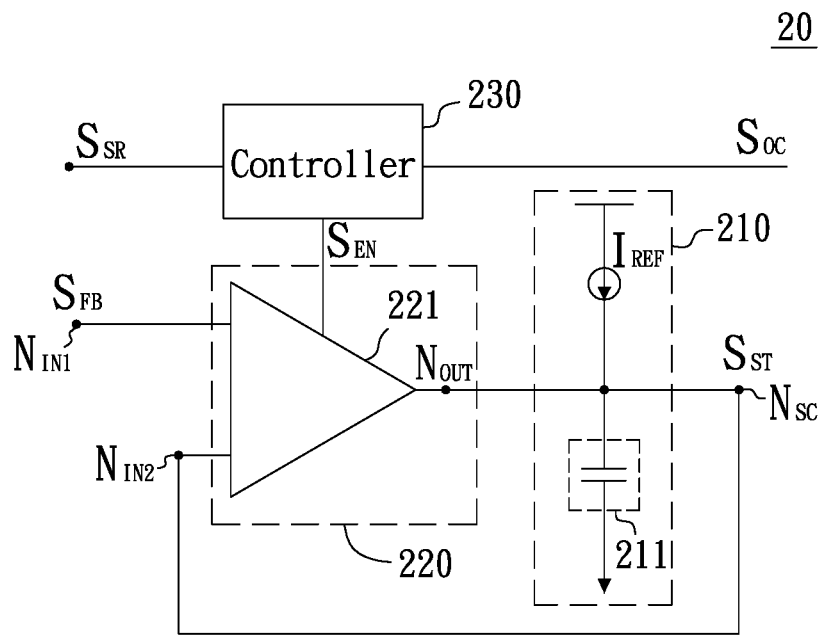
FIG. 4 is a schematic diagram illustrating an embodiment of a control circuit for the voltage regulator of FIG. 1.

Referring to FIG. 4, an embodiment of the control circuit 20 for the voltage regulator 10 of FIG. 1 is illustrated in a schematic diagram form. As shown in FIG. 4, the soft-start tracking circuit 220 may be implemented including an operational amplifier 221. In this example, the operational amplifier 221, when enabled, can make the voltage at the output terminal $N_{OUT}$ follow the voltage at the first input terminal Nuri so that the soft-start signal provided by the soft-start circuit substantially follows the feedback signal from the voltage regulator 10. The operational amplifier 221 can provide the current sufficient for enabling the soft-start signal $S_{ST}$ to follow the feedback signal $S_{FB}$ while draws very little current from the first input terminal $N_{IN1}$.

In FIG. 4, the soft-start circuit 210 may be implemented by using a capacitive circuit 211, such as a capacitor, which is coupled to a current source $I_{REF}$.

Figure 5:
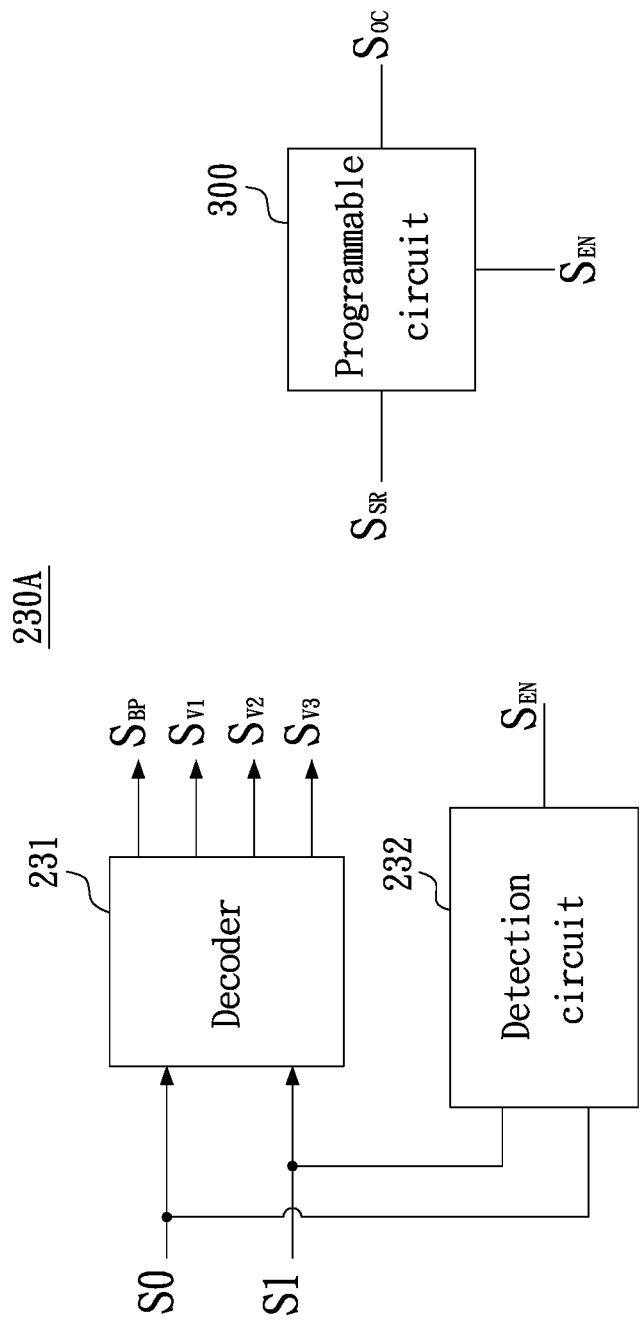
FIG. 5A is a schematic diagram illustrating an embodiment of a controller of the control circuit of FIG. 4.
FIG. 5B is a schematic diagram illustrating another embodiment of a controller of the control circuit of FIG. 4.

Referring to FIG. 5A, an embodiment of the controller 230 of the control circuit 20 of FIG. 4 is illustrated in a schematic diagram form. As shown in FIG. 5A, the controller 230A includes a decoder 231 and a detection circuit 232, which can be implemented by using any logic circuits, such as latches, flip-flops, logic gates, registers, or any other whenever appropriate, and/or other circuit components.

For example, as exemplified in FIG. 5A, if the selection request signal $S_{SR}$ is implemented in a form of two digital signals, indicated by S0 and S1, the decoder 231 may convert the two digital signals into a plurality of output digital signals serving as the output control signal $S_{OC}$, according to TABLE 1 as follows. Referring to FIG. 4, the output control signal $S_{OC}$, for example, can be implemented as or further converted into the control signals $S_{V1}$, $S_{V2}$, and $S_{V3}$ for controlling the switches SW1-SW3 so as to enable the voltage regulator 10 to provide the output voltage $V_{OUT}$ at the desired one of the voltage levels. In addition, the control signal $S_{BP}$ is used for bypass mode, for example. Certainly, the implementation of the invention is not limited to the above examples.

TABLE 1

| S1 | S0 | Output voltage level |
|---|---|---|
| 0 | 0 | Bypass mode (e.g., 4.2 V) |
| 0 | 1 | First voltage level (e.g., 6.2 V) |
| 1 | 0 | Second voltage level (e.g., 7.5 V) |
| 1 | 1 | Third voltage level (e.g., 9.05 V) |

The detection circuit 232 can be implemented to determine whether the output voltage selection indicated by the selection request signal $S_{SR}$ satisfies a criterion, for example, as in one of the above embodiments, so as to output the enabling signal $S_{EN}$ selectively. The detection circuit 232 may be implemented by comparing the output voltage selection indicated by an updated selection request signal $S_{SR}$ (e.g., denoted by SEL1) and the output voltage selection indicated by the present one (e.g., denoted by SEL0), wherein one or both of the output voltage selections (e.g., SEL1 or SEL0) may be stored for comparison accordingly. In addition, the detection circuit 232 may be implemented to determine whether any transition from SEL0 to SEL1 meets the criterion by operations such as a calculation, lookup table, state machine, conditional logic or any suitable operation. Certainly, the implementation of the invention is not limited to the above examples.

In another embodiment, as shown in FIG. 5B, the controller 230 may be implemented by using a programmable circuit 300, such as a microprocessor, a microcontroller, and so on.

In the above embodiments as shown in FIG. 1, 4, 5A or 5B, the controller (such as 230, 231, or 300) can be optionally configured to output the output selection signal $S_{OS}$. However, the implementation of the invention is not limited to the above examples. For instance, the generation of the output selection signal $S_{OS}$ may be implemented outside the controller (such as 230, 231, or 300) or inside the voltage regulator 10.

Figure 7:
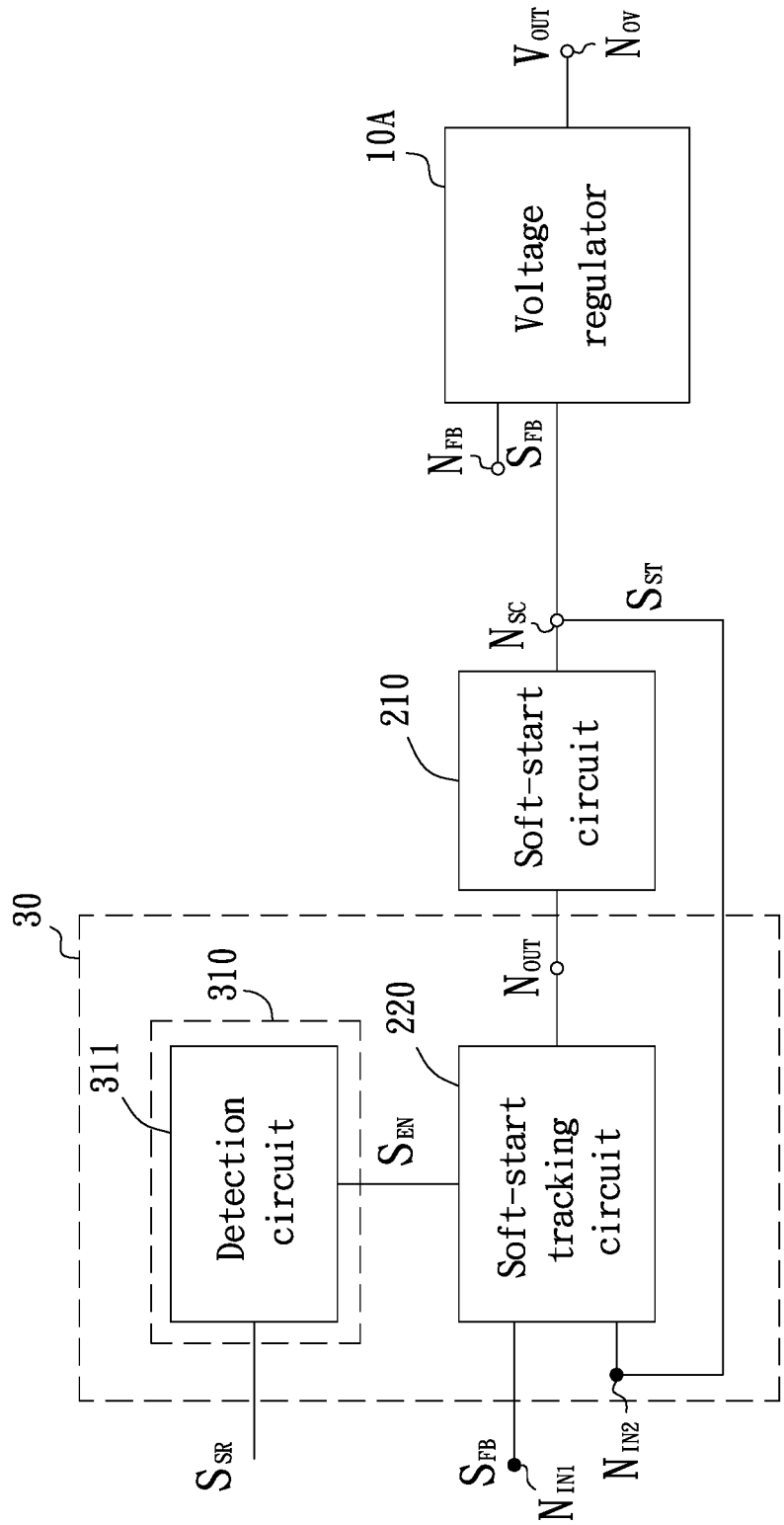
FIG. 7 is a schematic diagram illustrating another embodiment of a control circuit for facilitating inrush current reduction for a voltage regulator.

Referring to FIG. 7, another embodiment of a control circuit for facilitating inrush current reduction for a voltage regulator is illustrated in a schematic diagram form. As shown in FIG. 7, a control circuit 30 is utilized for facilitating inrush current reduction for a voltage regulator 10A. The voltage regulator 10A is implemented based on the voltage regulator 10 in FIG. 1 or further integrated with a function of decoding or generating the selection request signal $S_{SR}$, such as the function of the decoder 231 exemplified in FIG. 5A or in other related manner. In this embodiment, the soft-start circuit 210 is regarded as an environmental component such that the control circuit 30 can be utilized in a scenario that the control circuit 30 can be applied to a voltage regulator such as the voltage regulator 10A in FIG. 7 with a soft-start circuit 210 coupled to the voltage regulator 10A.

As shown in FIG. 7, the control circuit 30 includes a soft-start tracking circuit 200 and a controller 310. The soft-start tracking circuit 200 includes a first input terminal Nuri for receiving a feedback signal $S_{FB}$ from the voltage regulator 10A, a second input terminal $N_{IN2}$, and an output terminal $N_{OUT}$, wherein the second input terminal $N_{IN2}$ and output terminal $N_{OUT}$ are used for being coupled to a soft-start circuit 210 for providing a soft-start signal $S_{ST}$ at a soft-start control terminal $N_{ST}$. The controller 310, coupled to the soft-start tracking circuit 220, configured to output an enabling signal $S_{EN}$ to the soft-start tracking circuit 220 selectively in accordance with the selection request signal $S_{SR}$. The soft-start tracking circuit 220 is operable in response to the enabling signal $S_{EN}$ so that the soft-start signal $S_{ST}$ provided by the soft-start circuit 210 substantially follows the feedback signal $S_{FB}$ from the voltage regulator 10A.

In an embodiment, the controller 220 may be implemented to include a detection circuit 311 configured to output the enabling signal $S_{EN}$ to enable the soft-start tracking circuit to operate when the output voltage selection, for example, indicated by the selection request signal $S_{SR}$, satisfies a criterion for generating the enabling signal $S_{EN}$. The detection circuit 311 may be implemented based on the detection circuit 232 or any other suitable circuit, or a programmable circuit as exemplified above.

In an embodiment, the detection circuit 311 determines that the output voltage selection satisfies the criterion when the output voltage selection indicates a selection from a present output voltage to a target output voltage higher than the present output voltage.

In an embodiment, the detection circuit 311 outputs the enabling signal $S_{EN}$ asserted for a time period to enable the soft-start tracking circuit 220 to operate.

Further, in some embodiments for practical applications, the voltage regulation apparatus 1, the control unit 20 or 30 may be utilized in an electronic device, for example a computing device, such as a smart phone or tablet computer, notebook computer, and so on. In some scenarios, the voltage regulation apparatus 1 may be employed to drive a speaker or earphone for playing sound, wherein the user of the computing device may adjust the volume of the sound and a selection request signal $S_{SR}$ can be generated directly or indirectly by a processing unit of the computing device. Because the voltage regulation apparatus 1 can lead to a reduced inrush current and overshoot voltage, the voltage regulation apparatus 1 or the control unit 20 or 30 can also prevent component damage in the electronic device caused by inrush current.

To sum up, the embodiments of the control circuit for facilitating inrush current reduction for a voltage regulator and the voltage regulation apparatus with inrush current reduction are provided, wherein the control circuit has the soft-start tracking circuit operable in response to the enabling signal so that the soft-start signal provided by the soft-start circuit substantially follows the feedback signal from the voltage regulator. In this way, whenever the voltage regulator has a level transition of its output voltage which will cause inrush current at its output voltage, the control circuit outputs the enabling signal to provide the soft-start signal following the feedback signal to the voltage regulator so as to reactivate soft-start functionality of the voltage regulator during level transition, thus reducing inrush current effectively and proactively.

While the present disclosure has been described by way of specific embodiments, numerous modifications, combinations, and variations could be made thereto by those skilled in the art without departing from the scope and spirit of the present disclosure set forth in the claims.

What is claimed is:

1. A control circuit for facilitating inrush current reduction for a voltage regulator, wherein the voltage regulator is used for providing an output voltage variable in response to an output voltage selection, the control circuit comprising:
   a soft-start circuit for providing a soft-start signal;
   a soft-start tracking circuit, including a first input terminal for receiving a feedback signal from the voltage regulator, a second input terminal coupled to the soft-start circuit, and an output terminal coupled to the soft-start circuit;
   a controller, coupled to the soft-start tracking circuit, configured to output an enabling signal to the soft-start tracking circuit selectively in accordance with the output voltage selection,
   wherein the soft-start tracking circuit is operable in response to the enabling signal so that the soft-start signal provided by the soft-start circuit substantially follows the feedback signal from the voltage regulator.

2. The control circuit according to claim 1, wherein the controller is configured to output the enabling signal to enable the soft-start tracking circuit to operate when the output voltage selection satisfies a criterion for generating the enabling signal.

3. The control circuit according to claim 2, wherein the controller determines that the output voltage selection satisfies the criterion when the output voltage selection indicates a selection from a present output voltage to a target output voltage higher than the present output voltage.

4. The control circuit according to claim 1, wherein the controller is further configured to output an output selection signal for informing the voltage regulator of the output voltage selection in response to the output voltage selection.

5. The control circuit according to claim 4, wherein the controller outputs the enabling signal asserted for a time period to enable the soft-start tracking circuit to operate when the controller outputs the output selection signal.

6. A voltage regulation apparatus with inrush current reduction, comprising:
   a voltage regulator to provide an output voltage variable in response to an output voltage selection, the voltage regulator including a soft-start terminal, an output voltage terminal, and a feedback terminal; and
   a control circuit, coupled to the voltage regulator, including:
   a soft-start circuit, coupled to the soft-start terminal, for providing a soft-start signal to the voltage regulator;
   a soft-start tracking circuit, including a first input terminal for receiving a feedback signal outputted from the feedback terminal of the voltage regulator, a second input terminal coupled to the soft-start circuit, and an output terminal coupled to the soft-start circuit; and
   a controller, coupled to the soft-start tracking circuit, configured to output an enabling signal to the soft-start tracking circuit selectively in accordance with the output voltage selection,
   wherein the soft-start tracking circuit is operable in response to the enabling signal so that the soft-start signal provided by the soft-start circuit substantially follows the feedback signal from the voltage regulator.

7. The voltage regulation apparatus according to claim 6, wherein the voltage regulator is a linear voltage regulator or a switching voltage regulator.

8. The voltage regulation apparatus according to claim 6, wherein the voltage regulator includes:
   an error amplifier, coupled to the feedback terminal, the soft-start terminal, and a reference voltage terminal;
   an output circuit stage, coupled between an output terminal of the error amplifier and the output voltage terminal; and
   a switchable voltage divider, coupled between the output voltage terminal and the feedback terminal, for providing the feedback signal in response to the output voltage selection so as to enable varying of the output voltage.

9. The voltage regulation apparatus according to claim 6, wherein the controller is configured to output the enabling signal to enable the soft-start tracking circuit to operate when the output voltage selection satisfies a criterion for generating the enabling signal.

10. The voltage regulation apparatus according to claim 9, wherein the controller determines that the output voltage selection satisfies the criterion when the output voltage selection indicates a selection from a present output voltage to a target output voltage higher than the present output voltage.

11. The voltage regulation apparatus according to claim 6, wherein the controller is further configured to output an output selection signal for informing the voltage regulator of the output voltage selection in response to the output voltage selection.

12. The voltage regulation apparatus according to claim 11, wherein the controller outputs the enabling signal asserted for a time period to enable the soft-start tracking circuit to operate when the controller outputs the output selection signal.

13. The voltage regulation apparatus according to claim 6, wherein the voltage regulation apparatus is a single chip.

14. A control circuit for facilitating inrush current reduction for a voltage regulator, wherein the voltage regulator is used for providing an output voltage variable in response to an output voltage selection, the control circuit comprising:
  a soft-start tracking circuit, including a first input terminal for receiving a feedback signal from the voltage regulator, a second input terminal, and an output terminal, wherein the second input terminal and the output terminal are used for being coupled to a soft-start circuit for providing a soft-start signal;
  a controller, coupled to the soft-start tracking circuit, configured to output an enabling signal to the soft-start tracking circuit selectively in accordance with the output voltage selection,
  wherein the soft-start tracking circuit is operable in response to the enabling signal so that the soft-start signal provided by the soft-start circuit substantially follows the feedback signal from the voltage regulator.

15. The control circuit according to claim 14, wherein the controller includes a detection circuit configured to output the enabling signal to enable the soft-start tracking circuit to operate when the output voltage selection satisfies a criterion for generating the enabling signal.

16. The control circuit according to claim 15, wherein the detection circuit determines that the output voltage selection satisfies the criterion when the output voltage selection indicates a selection from a present output voltage to a target output voltage higher than the present output voltage.

17. The control circuit according to claim 14, wherein the detection circuit outputs the enabling signal asserted for a time period to enable the soft-start tracking circuit to operate.

* * * * *